(No Model.)
W. NICHOLS.
BRIDLE BIT.
No. 471,493. Patented Mar. 22, 1892.
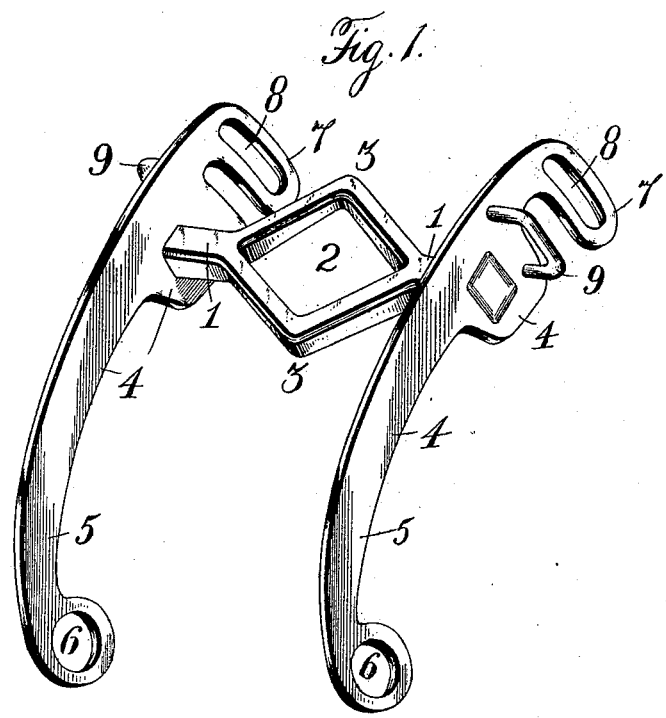
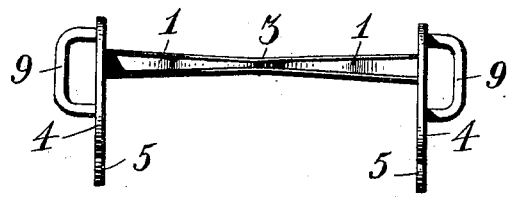
Witnesses:
Jas. E. Hutchinson.
Dennis Sumby.
Inventor.
William Nichols,
By James L. Norris.
Attorney.

UNITED STATES PATENT OFFICE.

WILLIAM NICHOLS, OF OZARK, ARKANSAS, ASSIGNOR OF ONE-HALF TO WILLIAM S. WEBB, OF SAME PLACE.

BRIDLE-BIT.

SPECIFICATION forming part of Letters Patent No. 471,493, dated March 22, 1892.

Application filed April 9, 1891. Serial No. 388,291. (No model.)

*To all whom it may concern:*

Be it known that I, WILLIAM NICHOLS, a citizen of the United States, residing at Ozark, in the county of Franklin and State of Arkansas, have invented new and useful Improvements in Bridle-Bits, of which the following is a specification.

My invention relates to and consists in certain novel improvements in the construction of bridle-bits and in the arrangement and combination of the several parts thereof, the purpose being to provide a curb-bit, or, as it is sometimes termed a "port-bit," especially adapted to the management of unruly and vicious horses.

To enable others skilled in the art to make, construct, and use my said invention, I will proceed to describe the same in detail, reference being had to the accompanying drawings, illustrating my invention, in which—

Figure 1 is a perspective view of a bridle-bit embodying my invention. Fig. 2 is a front elevation of the same.

The reference-numeral 1 in said drawings indicates the bit-bar, which consists of a strong substantially rectangular bar having the sharp angles beveled or rounded off. The ends of this bar are firmly set in the cheek-pieces, which will be presently described, and at a little distance from the inner faces of the cheek-pieces the bit-bar is divided longitudinally and the divided parts are spread or separated one from the other to form a substantially diamond-shaped or lozenge-shaped open frame 2, having angles 3, which lie in a line drawn transversely through the central part of the bit-bar. The sharp edges or angles of the frame 2 are rounded or beveled, so as to prevent danger of wounding the tissues of the mouth, and the angles 3 are also dressed off upon the exterior, as shown in the drawings, for the same purpose. The proportions of this frame may be modified, and in place of being of a lozenge or diamond shape it may be rectangular, or nearly so, with the angles 3 at a greater or less distance from the axial line of the bit-bar, as circumstances may require; but in ordinary use the form shown in the drawings is that preferred.

The bit-bar is made somewhat thinner in its central portion, and from that point it is gradually thickened toward each end, this diminution in size being in one direction only in order that the mouth piece or port may present as little obstruction as possible to the swallowing of the animal and be as light as possible consistently with the required strength.

The cheek-pieces consist of curved flat plates of metal 4, of such width as to receive the ends of the bit-bar 1, having a wide margin around the point of attachment. Formed with this plate are arms 5, having eyes 6 at their ends for the snap hooks or loops on the curb-rein, and extending in the opposite direction are short arms 7, having elongated loops or eyes 8 to receive the ends of the curb chain or strap. Riveted into the plates 4 are staples 9, so arranged as to receive the ends of the cheek-straps. When used upon animals unusually wild or of a very vicious temper, the curb-chain may be omitted, so that a comparatively slight strain upon the reins or bridle will throw the port or mouth piece transversely across the mouth, the lower angle 3, bearing down in the fork of the jaw, which is a very sensitive portion of the mouth, and no horse will pull against it. At the same time the cheek-pieces are turned across the sides of the mouth if the curb is moderately loose, and they prevent the bit from sliding through the mouth when the latter is thrown wide open, which has often happened with unruly animals.

By the form given to the port or mouth piece the bars are prevented from coming in contact with the teeth of the horse, which have often been broken by the powerful bits of other forms. By making the port in the diamond or lozenge shape shown the action of the jaws will tend to crowd the port away from the teeth should the bit become displaced laterally. The diminution in thickness toward the center also gives a light, but strong, construction and aids materially in avoiding the sensations of weight and obstruction which soon produce a fretful condition of the animal.

The bit may be manufactured very cheaply and it furnishes a perfect safeguard against runaway accidents, as it will arrest the wildest horse almost instantly.

What I claim is—

The herein-described bridle-bit consisting of the curved cheek-pieces 4, formed at one of their ends with arms having eyes for the reins and at their other ends having arms provided with eyes for a curb-chain, laterally-projecting staples attached to said curved cheek-pieces 4, and a bit-bar 1, connecting said curved cheek-pieces and formed in a single piece with the open rectangular frame 2 projecting rigidly from opposite sides of the bar and converging to sharp angles at such opposite sides, said bit-bar gradually diminishing in thickness from its ends to its center, for the purposes described.

In testimony whereof I have hereunto set my hand and affixed my seal in presence of two subscribing witnesses.

WILLIAM NICHOLS. [L. S.]

Witnesses:
L. A. F. WOODS,
A. E. GREEN.